UNITED STATES PATENT OFFICE.

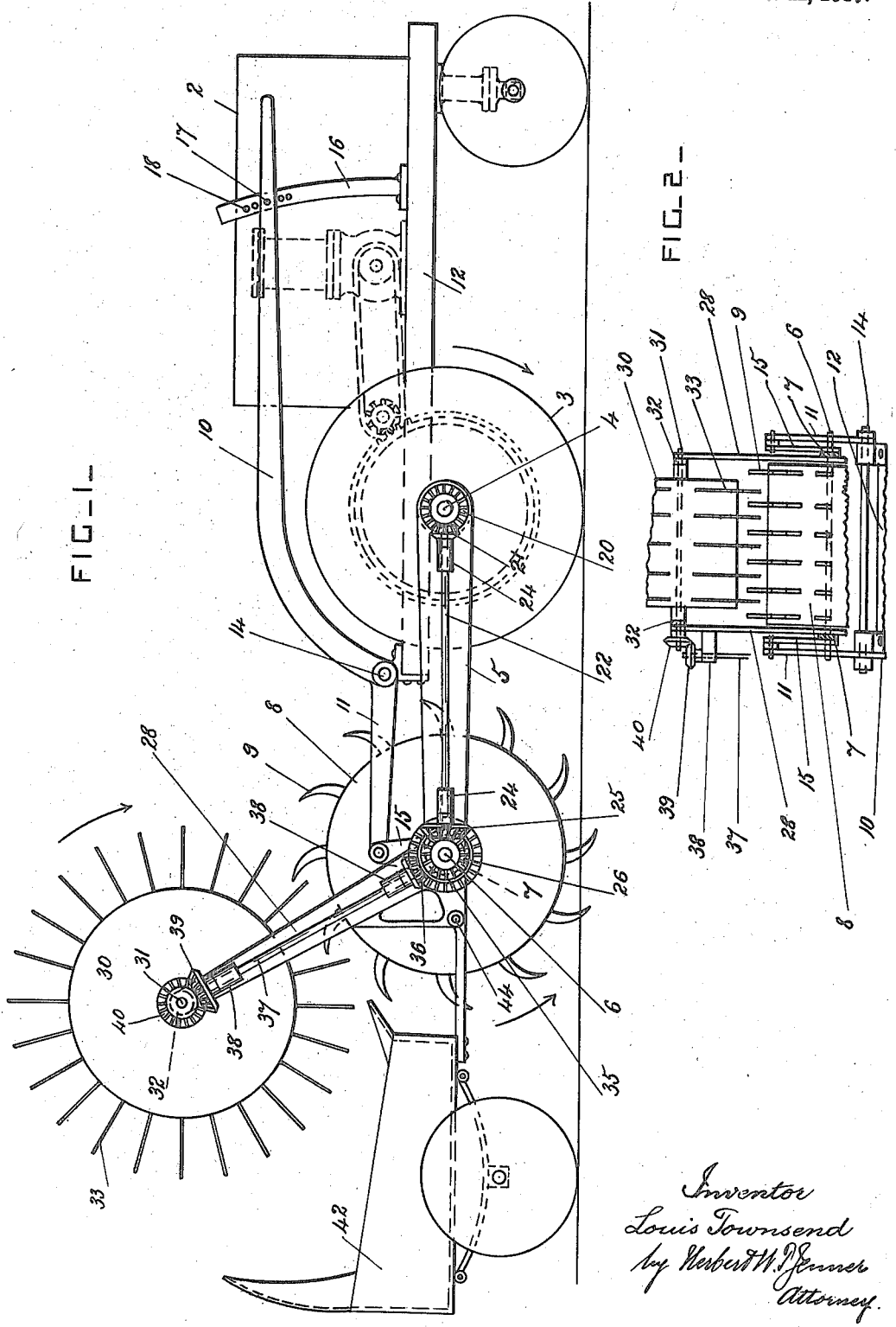

LOUIS TOWNSEND, OF EVANSVILLE, INDIANA.

COMBINED HARROW AND CLEANER.

1,249,555.　　　Specification of Letters Patent.　Patented Dec. 11, 1917.

Application filed June 9, 1917.　Serial No. 173,695.

*To all whom it may concern:*

Be it known that I, LOUIS TOWNSEND, a citizen of the United States, residing at Evansville, in the county of Vanderburg and State of Indiana, have invented certain new and useful Improvements in Combined Harrows and Cleaners; and I do hereby declare the following to be a full, clear, and exact description of the invention, such as will enable others skilled in the art to which it appertains to make and use the same.

This invention relates to rotary harrows for attachment to tractors; and it consists in the novel construction and combination of the parts hereinafter fully described and claimed.

In the drawings, Figure 1 is a side view of portions of a tractor provided with a rotary harrow, a harrow tooth cleaner, and a truck for the rubbish, arranged and combined according to this invention. Fig. 2 is an end view of portions of the harrow and its cleaner, and is drawn to a smaller scale.

A tractor 2 of any approved construction is provided. This tractor has ground wheels 3 mounted on an axle 4 and revolved in the direction of the arrow, so that the whole is moved along by the engine of the tractor.

A frame 5 for the harrow is provided and is pivoted at one end to the end portions of the tractor axle 4, and extends rearwardly of the tractor. A shaft 6 is journaled in bearings 7 on the frame 5, and 8 is a rotary harrow secured on the shaft 6. This harrow is a cylinder provided with curved teeth 9 at its periphery arranged in rows at suitable distances apart, and driven positively from the tractor, but in the reverse direction to the tractor ground wheels 3. The harrow teeth are rigidly secured to the harrow cylinder, and they are curved and pointed, and are arranged so that their points project forwardly in the direction of their circumferential motion which is their forward motion at the bottom side of the harrow cylinder when engaging with the ground. The harrow cylinder is relatively large in diameter, and it is arranged beyond the rear end of the tractor frame 12, and its upper part projects above the level of the top of the said frame 12. The harrow teeth engage with the furrowed ground, and the depth of their engagement is regulated and adjusted by means of a lever 10. This lever 10 has two arms 11 at its rear end portion, and these arms are arranged one at each end of the harrow cylinder.

This lever 10 is pivoted at its middle part to the main frame 12 of the tractor by a pin 14, and its rear end portion is pivotally connected with the harrow shaft by links 15 or in any other approved way. Locking mechanism is provided on the tractor frame for securing the lever 10 to it after the harrow has been adjusted. This locking mechanism is of any approved sort, and in the example shown a bracket 16 is secured to the tractor frame, and the lever 10 is secured to it by a pin 17 which engages with a hole in the lever and with any hole of a series of holes 18 in the bracket.

The harrow is revolved from the tractor by any approved driving mechanism, and in the example shown a beveled toothed wheel 20 is secured on the tractor axle 4 which gears into a beveled toothed wheel 21 secured on a longitudinal shaft 22. The shaft 22 is journaled in bearings 24 on the harrow frame 5, and a beveled toothed wheel 25 is secured on its rear end portion. This wheel 25 gears into a beveled toothed wheel 26 secured on the shaft 6 of the harrow.

An auxiliary frame 28 is secured rigidly to the frame 5 of the harrow, and projects upwardly and to the rear of the harrow. A toothed cleaner cylinder 30 is mounted on a shaft 31 which is journaled in bearings 32 on the upper end portion of the auxiliary frame 38. This cleaner cylinder has radial teeth 33 arranged in rows, and so that their free end portions work between the harrow teeth.

The cleaner cylinder is driven in the reverse direction from the harrow, and it is driven positively and by any approved driving mechanism. In the example shown a beveled toothed wheel 35 is secured on the shaft 6 of the harrow, and gears into a beveled toothed wheel 36 secured on a shaft 37 which is arranged longitudinally of the auxiliary frame 28, and journaled in bearings 38 on said frame. The upper end of the shaft 37 has a beveled toothed wheel 39 secured on it, and this wheel gears into a beveled toothed wheel 40 secured on the shaft 31 of the cleaner cylinder. The curved arrows in the drawings show the direction of motion of the various revolving parts.

A two-wheeled truck 42, or trailer, is coupled pivotally to the rear end portion of the harrow frame in any approved way, and its front end portion is arranged under the cleaner cylinder which overhangs the harrow. The cleaner cylinder is revolved positively at any approved speed, and it may advantageously be driven at a higher speed than the harrow.

The rough furrows are harrowed by the teeth of the harrow cylinder as the tractor moves forwardly, and the trash which is carried up by the harrow teeth is removed by the revolving cleaner, and is discharged into the truck or trailer, so that the surface of the soil is left clear of rubbish and comparatively smooth.

The two-wheeled truck adapts itself automatically to the ground and its pivotal connection 44 with the harrow frame enables it to adjust itself to the adjustments and movements of the harrow.

What I claim is:

1. The combination, with a tractor provided with a main frame and having an axle and ground wheels, of a harrow frame pivoted to the said axle, a harrow cylinder provided with harrow teeth and journaled in the harrow frame and arranged beyond the rear end of the tractor frame, means for adjustably supporting the harrow cylinder and its frame, driving mechanism which revolves the harrow cylinder from the tractor in the reverse direction to its ground wheels, an auxiliary frame secured to the harrow frame, a cleaner cylinder journaled in the auxiliary frame and arranged above the harrow cylinder and provided with teeth which work between the harrow teeth, and driving mechanism which revolves the cleaner cylinder in the reverse direction to the harrow cylinder.

2. The combination, with a tractor provided with a main frame and having an axle and ground wheels, of a harrow frame having its front end portion pivoted to the said axle, a harrow cylinder journaled in the rear end portion of the harrow frame and arranged beyond the rear end of the tractor frame with its upper side projecting above the level of the tractor frame, said harrow cylinder having curved and pointed harrow teeth secured to it with their points projecting forwardly when at its lower side, means for adjustably supporting the harrow cylinder and its frame, and driving mechanism which revolves the harrow cylinder from the tractor in the reverse direction to the said ground wheels as the tractor drags it along.

3. The combination, with a tractor provided with an axle and ground wheels, of a harrow frame having its front end portion pivoted to the said axle, a harrow cylinder journaled in the rear end portion of the harrow frame and having curved and pointed harrow teeth secured to it with their points projecting forwardly when at its lower side, means for adjustably supporting the harrow cylinder and its frame, driving mechanism which revolves the harrow cylinder from the tractor in the reverse direction to the said ground wheels as the tractor drags it along, an auxiliary frame which extends upwardly and rearwardly from the harrow frame, a cleaner cylinder journaled in the free end portion of the auxiliary frame above the level of the upper side of the harrow cylinder and provided with teeth which work between the harrow teeth, and driving mechanism which revolves the cleaner cylinder in the reverse direction to the harrow cylinder.

In testimony whereof I have affixed my signature.

LOUIS TOWNSEND.